United States Patent
Johansson et al.

(10) Patent No.: US 7,840,832 B2
(45) Date of Patent: Nov. 23, 2010

(54) FAULT TOLERANT CONTROL SYSTEM

(75) Inventors: Rikard Johansson, Linköping (SE);
Kjell Wistedt, Linköping (SE)

(73) Assignee: SAAB AB, Linköping (SE)

( * ) Notice: Subject to any disclaimer, the term of this patent is extended or adjusted under 35 U.S.C. 154(b) by 446 days.

(21) Appl. No.: 11/798,719

(22) Filed: May 16, 2007

(65) Prior Publication Data
US 2008/0072099 A1   Mar. 20, 2008

(30) Foreign Application Priority Data
May 16, 2006   (EP) .................................. 06114052

(51) Int. Cl.
*G06F 11/00*   (2006.01)
(52) U.S. Cl. .................. 714/2; 714/1; 714/38
(58) Field of Classification Search .............. 714/1, 714/2, 38
See application file for complete search history.

(56) References Cited
U.S. PATENT DOCUMENTS

| | | | |
|---|---|---|---|
| 4,141,066 A * | 2/1979 | Keiles | 700/81 |
| 4,590,549 A | 5/1986 | Burrage et al. | |
| 4,890,284 A | 12/1989 | Murphy et al. | |
| 5,600,808 A | 2/1997 | Kasukawa | |
| 5,617,425 A * | 4/1997 | Anderson | 714/710 |
| 6,154,850 A * | 11/2000 | Idleman et al. | 714/5 |

FOREIGN PATENT DOCUMENTS

WO   WO-02/073505 A1   9/2002

OTHER PUBLICATIONS

European Search Report—Nov. 21, 2006.
Hecht et al; A Distributed Fault Tolerant Architurecture for Nuclear Reactor and Other Critical Process Control Applications; IEEE; 1991; pp. 462-469.
S. Murugesan; Dependable Software Through Fault Tolerance; IEEE; 1989; pp. 391-399.

* cited by examiner

*Primary Examiner*—Emerson C Puente
(74) *Attorney, Agent, or Firm*—Venable LLP; Eric J. Franklin

(57) ABSTRACT

A fault tolerant data processing system for controlling a real time process. The system is tolerant to systematic faults in its software. The system includes a data processor unit with a program memory and a data memory and input and output units where program software residing in the program memory can be executed on the data processor unit. The system includes a normal-mode software program residing in the program memory, and a backup-mode software program also residing in the program memory arranged to perform the same or similar function of the normal mode software program but being differently implemented than the normal-mode software program, and where a trigger signal received by the data processor unit can switch execution control such that the normal-mode software program stops executing and the backup-mode software program starts executing.

16 Claims, 6 Drawing Sheets

| Memory Location | Memory content |
|---|---|
| N+0 | Instruction for normal mode |
| N+1 | " |
| N+2 | " |
| N+3 | " |
| N+4 | " |
| " | " |
| " | " |
|  |  |
| M+0 | Instruction for backup mode |
| M+1 | " |
| M+2 | " |
| M+3 | " |
| M+4 | " |
| M+5 | " |
| " | " |
| " | " |

FIG. 1b

FAULT TOLERANT CONTROL SYSTEM

CROSS-REFERENCE TO RELATED APPLICATION

This application claims priority to European patent application number 06114052.9 filed 16 May 2006.

THE FIELD OF THE INVENTION

The present invention relates to fault tolerant control systems and method for activating backup functions and, especially, control systems and methods in a flight vehicle wherein a backup system is divided to detect/handle faults generated by different causes.

BACKGROUND OF THE INVENTION

Today's aircraft are provided with a number of control systems, these control systems requires an independent backup system in order to secure that no single faults (systematically or randomly occurring faults) can cause a system failure. Traditional backup system often tries to solve two problems at the same time, i.e. both to take care of the systematic faults, and to take care of randomly occurring faults, whereby the system can operate independently if the fault is a randomly generated fault or a systematically generated fault. The systematic faults will always occur when certain criteria are fulfilled during the execution of a program, such as receiving certain input data. Traditional calculations of fault probabilities and MTBF (mean time between failures) are based on the probability of randomly generated faults.

The document Murugesan S. "Dependable Software through fault tolerance" discloses the general technical background of eliminating errors and handling faults in software. The Murugesan document discloses the design diversity and N-version programming which concerns the running of different variants of the program to establish a consensus on a correct output.

The document WO, A1, 02073505 relates to real time computing systems for recovering after a single event upset, i.e. a randomly occurring fault. The system switches between two programs when an error occurs in the memory of one of the programs.

The document by Hecht M. et al. "A distributed fault tolerant architecture for nuclear reactor and other critical process control applications" relates to a fault tolerant system comprising a supervisor node that supervises over an active node and a shadow node. The system switches node when an error occurs in the system.

The document "System structure for software fault tolerance" Randell Brian, discloses a fault tolerant system based on recovery blocks from a cache. The system uses multiple recovery blocks wherein different alternatives are evaluated each time a function is executed. The system is a software program that in a robust manner structures the program to deal with faults but the program is not undependable.

The main problem with backup systems of today is that they increase the weight and the cost of the computing systems as well as reduce the availability of the system. The object of the present invention is to solve this problem without reducing the safety of the systems. Neither of the above mentioned documents relates to divide the backup system into two parts according to the present invention and thereby reducing the amount of hardware in the backup system of today.

SUMMARY OF THE INVENTION

The present invention solves the above stated problem by providing systems and a method.

A system is provided that divides the backup system into two parts wherein randomly generated faults are detected and handles by using a more or less identical hardware which is already needed in order to guarantee the availability of the normal functions of the control system and wherein the backup system, a software program, focuses to handle systematically generated faults and thereby the amount of hardware can be reduced.

According to a first aspect, the present invention provides a fault tolerant data processing system for controlling a real time process, said system being tolerant to systematic faults in its software and comprising a data processor unit with a program memory and a data memory and input and output units where program software residing in the program memory can be executed on the data processor unit. The system comprises a normal-mode software program residing in said program memory, and a backup-mode software program also residing in said program memory arranged to perform the same or similar function of the normal mode software program but being differently implemented than the normal-mode software program, and where a trigger signal received by the data processor unit can switch execution control such that the normal-mode software program stops executing and the backup-mode software program starts executing.

The backup-mode software program may be differently implemented than the normal mode software program by using different algorithms, different control laws or the likes.

The backup-mode software program may further be differently implemented than the normal mode software program by using a different programming language, different compilers, different linkage editors or the likes.

The system may comprise a backup activation system comprising a number of activation devices capable of issuing an error signal when an error is discovered, each activation device is connected to a voter unit, said voter unit being connected to the data processor unit and arranged to issue a trigger signal when a majority of the activation devices issues an error signal.

The system may disclose wherein said switch of execution control may be implemented by letting the trigger signal trigger a Non-Maskable Interrupt (NMI) which subsequently transfers execution control to the backup-mode software program.

The system may further disclose an embodiment wherein said switch of execution control may be implemented by activating a Reset subroutine and subsequently forcing execution control to the backup-mode software program.

The system may further disclose an embodiment where said backup-mode software may comprise software instructions for reading and updating process data from the input means before performing process control via the output means.

The system may further disclose an embodiment where process data may be stored in more than one place in the data memory and is protected against undetected corruption by a checksum or an error correcting code.

The system may be a control system of a vehicle.

According to a second aspect, the present invention relates to a method for activating a backup mode software program in a real time process of a system that is tolerant to systematic faults in the software of the system comprising the steps;

detecting a fault in said system running a normal-mode software program, triggering an interruption to the running normal-mode software switching execution such that the normal-mode software program stops executing and a backup-mode software program starts executing, wherein the backup-mode software program performs the same or similar function of the normal mode software program but being differently implemented than the normal-mode software program The method may further comprise a step of:

determining by a voter if a triggering signal should be sent to interrupt the process.

The method may further comprise the step of:

synchronising the backup mode software program by retrieving parameters and storing the parameters in a safe storage of the control system.

The method may further comprise, after the system has been interrupted, the steps of:

retrieving the parameters from the safe storage; and checking by checksums that the parameters are reliable.

The method may be a method for activating a backup mode software program in a real time process of a control system of a vehicle.

According to a third aspect, the present invention discloses a fault tolerant real time data processing system that comprises a number of dissimilar hardware replicas of data processing units executing the same software, said software being divided into normal mode software and backup mode software arranged to perform the same or similar function of the normal mode software program but being differently implemented than the normal-mode software program and where switching from executing normal mode software to executing backup mode software is initiated by an activation device.

The system may further comprise an output voter arranged to determine an output from said data processing units. The present invention additionally discloses the system wherein the output voter may be arranged to use a choice of majority in order to determine the output from said data processing units.

The system may further comprise a voter arranged to determine if a triggering signal for triggering said switching should be sent to the data processing units.

The system may be a control system of a vehicle.

BRIEF DESCRIPTION OF THE DRAWINGS

The invention will be described in more detail below with reference to preferred embodiments and with reference to the attached drawings, of which FIG. 1a schematically illustrates a first embodiment of a process control system according to the invention.

DETAILED DESCRIPTION OF EMBODIMENTS OF THE INVENTION

The following definitions will be used in this document for the purpose of explaining the present invention:

A randomly occurring fault is a fault that is occurring in a system due a component breaking or an event setup occurs randomly.

A systematically occurring fault is a fault that is generated during the construction of the system, such as programming errors. The systematic faults will always occur when certain criteria are fulfilled during the execution of a program, such as receiving certain input data.

A dissimilar replica is a replica that is similar in the functionality of a hardware that it is a replica of but is different, dissimilar, in the hardware structure.

A safe storage is a storage of data that is not affected by a systematically occurring fault in a software of the system.

Differently implemented means that a software program is different than another software program in the matter of the development process of the software. This means that the different software programs differ in algorithms, control laws, using different programming languages, compilers, interpreters, linkage editors, design or the likes.

An activation unit is a unit capable of detecting an error resulting from a systematic fault, which gives rise to manifestations from which it is possible to draw the conclusion that an error has occurred.

Figure 1A:
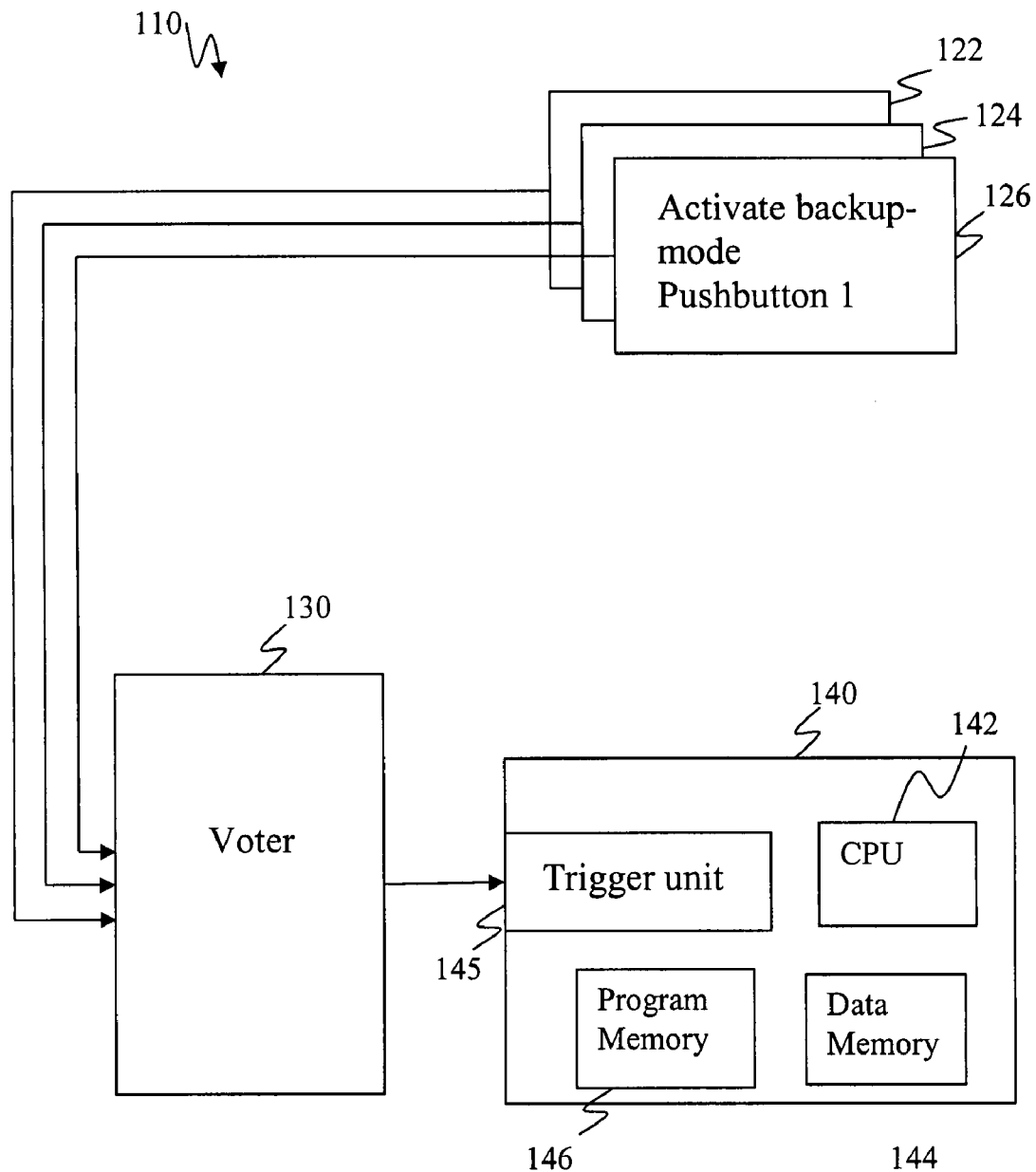
FIG. 1b illustrates schematically how two sets of software instructions, corresponding to a normal mode program, and a backup mode program are stored in the program memory of the system of FIG. 1a FIG. 1c schematically illustrates a control system of an aircraft.

FIG. 1a shows a schematic illustration of a first preferred embodiment of a process control system 110 according to the invention. A data processor unit 140 having a program memory 146, a data memory 144, a central processing unit (CPU) 142 and input and output means is provided with a trigger unit 145 and the trigger 145 unit is connected to the CPU 142 via the input/output means. In another embodiment the trigger unit 145 is connected directly to the CPU 142. The trigger unit 145 is connected to a voter 130 for receiving a trigger activation signal from said voter 130. The voter 130 is connected to three pushbuttons 122-126. When an operator decides that a fault has occurred in the system, he pushes all three pushbuttons 122-126, and a voter activation signal is sent from each pushbutton to the voter 130. To avoid accidental activation of a backup-mode, the voter 130 is arranged to issue a trigger activation signal only in the event that two or more out of three pushbuttons 122-126 are pressed.

The trigger unit 145 is arranged to transfer execution control from normal mode software instructions residing in the program memory of the data processor unit starting at memory location N (see FIG. 1b) to backup mode software instructions residing in the program memory of the data processor unit starting at memory location M.

The trigger unit 145 is connected to the CPU 142 such that said trigger unit 145 activates a Non-Maskable Interrupt, NMI. In a different embodiment of the invention, a Reset is activated to interrupt the software program. Said interrupt forces the CPU 142 to execute the backup mode instructions instead of the normal mode instructions. The backup mode instructions are arranged in memory location (M+0), corresponding to the NMI, as shown in FIG. 1b. In an embodiment of the invention, a pin of the CPU 142 is connected to NMI and the pin is activated by powering the pin with 5V alternative 0 depending how the CPU is implemented, i.e. the NMI is activated either by powering up or down the pin. When the NMI is activated the processor is forced to go to a predetermined address containing the backup mode instructions, i.e. the backup software program.

The difference between normal mode instruction and backup mode instructions in the first embodiment is that normal mode instructions have been developed in a process with a number of design goals giving high priority to high efficiency and performance and using a certain high level language and a certain low level language instruction generator when programming. The backup mode instructions have been developed in a process with a number of design goals giving high priority to simplicity and robustness and using another high level language and another low level language instruction generator when programming. In this way, a fault or a bug in the normal mode instructions causing a runtime error under certain conditions is not likely to have a counterpart in the backup mode instructions.

Thus, the backup program software may differ in the requirements from the normal program software by using different algorithms and differing in the implementation of the program by using a different software design, being written in a different programming language, using different compilers, using facilitated control laws or the likes in order to avoid making the same systematic fault in the program.

Figure 1C:
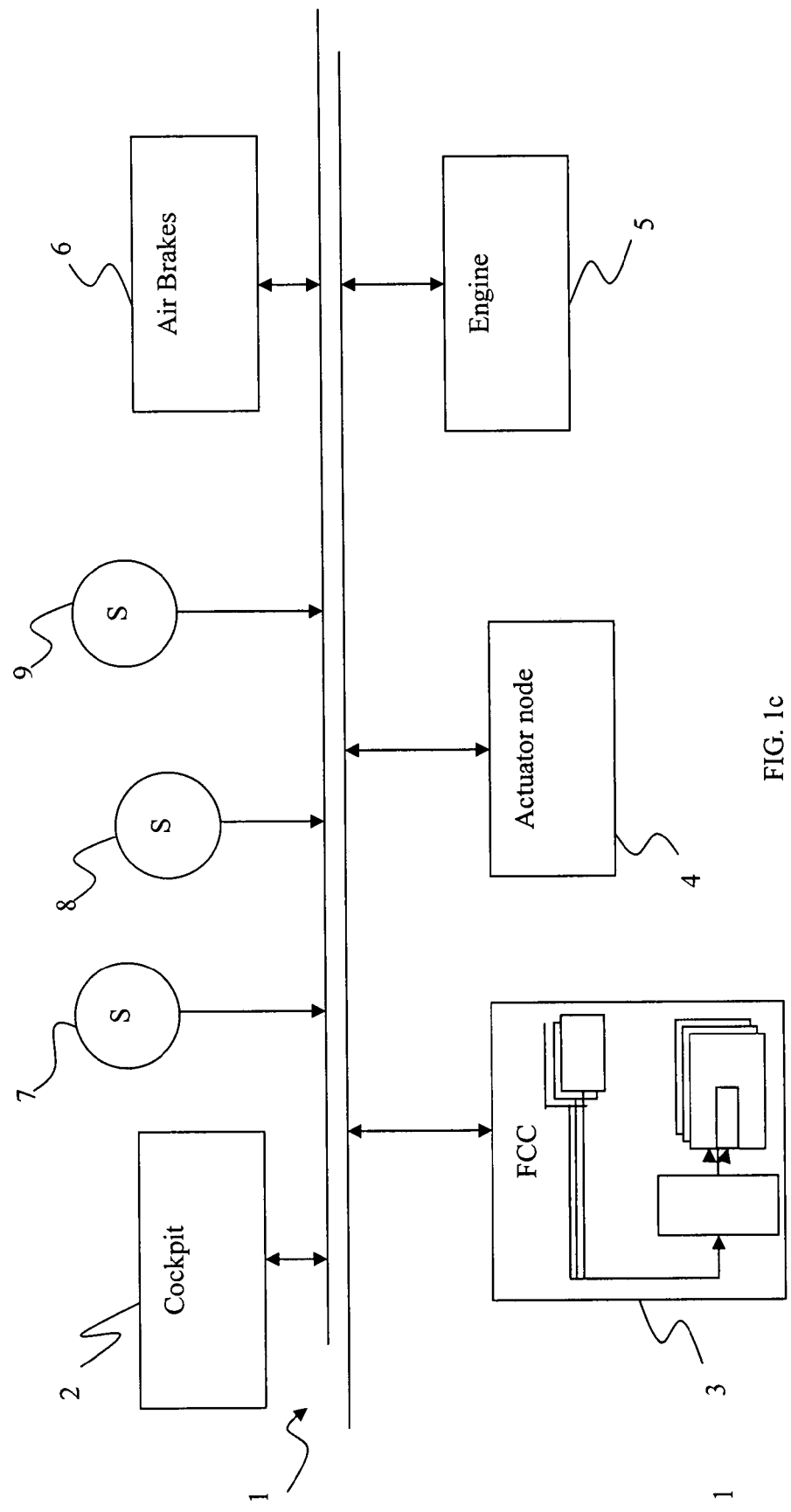

Referring now to FIG. 1c, a schematic illustration of a second embodiment of the present invention, a distributed flight control system 1 of a flight vehicle is disclosed. The control system 1 comprises a number of control elements such as cockpit instruments 2, flight control computer (FCC) 3, actuator node 4, engine 5, air brakes 6 and the likes. An actuator node 4 may be adapted to control canard, elevon control surfaces or the likes of the flight vehicle. The system also receives readings from a number of sensors 7-9. These sensors are used to collect data, parameters, to provide the flight control system with input data. The sensors may be accelerometers, rate gyros, instruments that collect air data and the likes. The FCC 3, in the illustrated embodiment, comprises control laws, activation units and a backup system according to the present invention whereas other nodes of the system may not need backup systems. This may be the case when the nodes comprise rather non complex functions that can be fully tested and analysed, a so called FAT-node, Fully Analyzable and Testable.

The present invention is adapted to be implemented in a system performing tasks, such as navigation and guidance; flight control, thrust control, fire control, weapon storage management and mission management or the likes.

Figure 2:
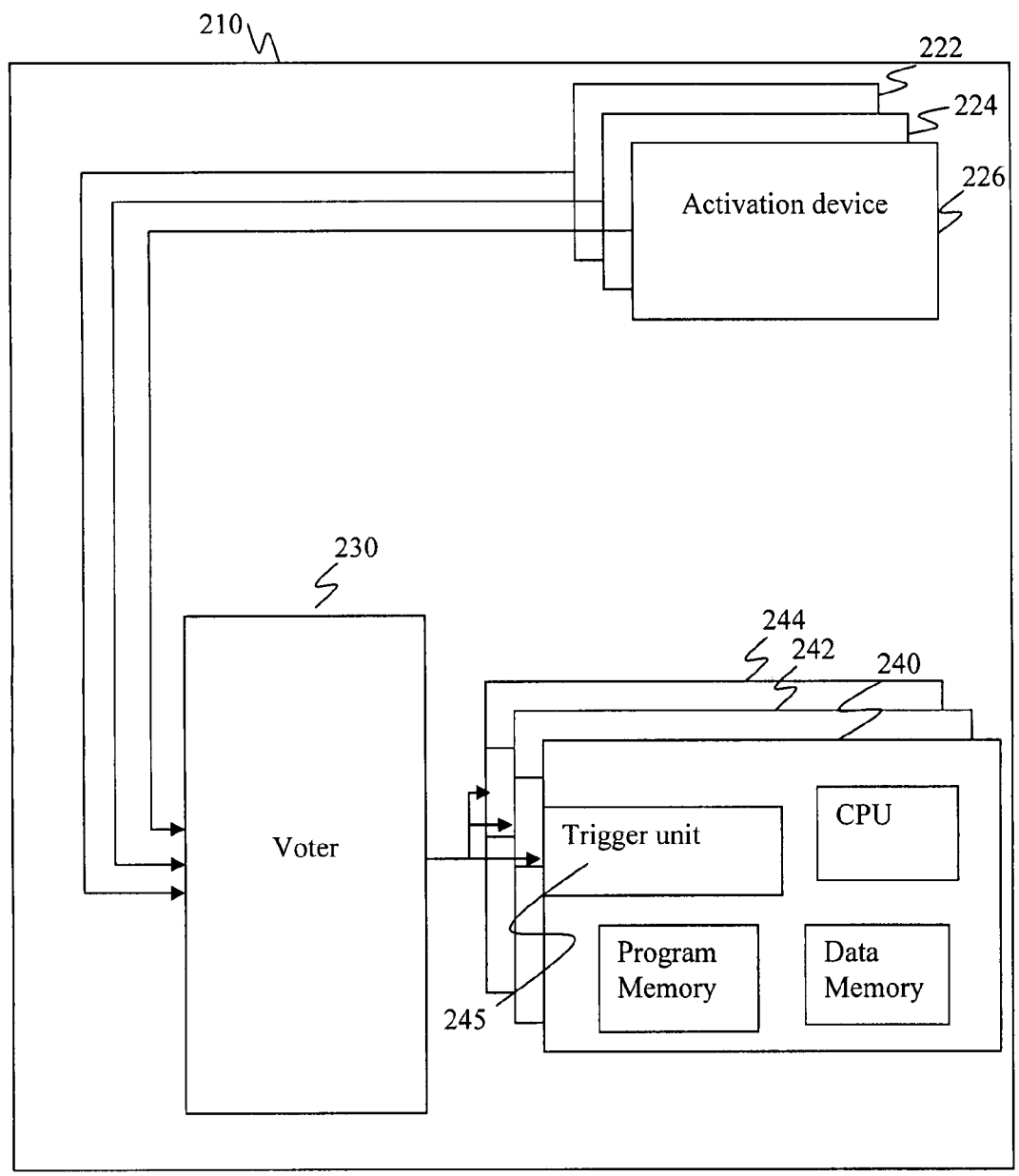
FIG. 2 schematically illustrates a device for detecting faults in a control system.

In FIG. 2 an overview of a control system 210 according to a third embodiment of the invention is shown. In the illustrated embodiment the activation of the backup mode software program is decided based on a number of activation units, wherein the illustrated system comprises three activation units 222, 224, 226, which activation units 222, 224, 226 may be implemented in a number of other system nodes, each of these system nodes may calculate similar algorithms as the control system and compare the output of the control system to their calculation, if majority of system nodes detect a significant mismatch from the output value of the control system to the calculated value, they can activate the backup mode software program in the control system via a voter 230. The activation units may be monitoring devices that monitor the FCC in FIG. 1c. An activation unit is monitoring that an output is generated from a process within the FCC, another is a sensor that is monitoring an instrument affected by said process within the FCC and the third activation unit is a manually operated activator that should be activated by the pilot when the pilot detects an error in the FCC. It should though be understood that the activation units may be implemented in normal mode software.

The voter 230 decides, in the embodiment, by using majority voting for fault detection to trigger the activation of the backup mode software program. A trigger unit 245 is arranged in a processor, such as a central processing unit, micro processor or FPGA 240 and is activated when the voter 230 decides that activation is desirable. The trigger unit 245 runs a Non Maskable Interrupt, NMI, or Reset routine in order to secure that the system may be forced into the backup mode.

It should be understood that the hardware system may and preferably does comprise of a number of hardware systems that are dissimilar replicas of each other, 240, 242 and 244 in FIG. 2. These dissimilar redundant hardware systems are in them selves enough to manage any random hardware fault. The different replicas may however be affected by the same systematic fault introduced in software requirements, design or implementation, the backup mode will however provide a mean to solve this problem.

In an embodiment (not shown), in order to detect a fault, these replicas processors 240-244 run parallel and an output voter or the like continuously determines by checking values from the different processors 240, 242, 244. When the voter detects a mismatch of the values coming from the processors, the voter selects the value through a majority decision from the processors. By using these replicas the system is tolerant to randomly occurring faults.

Backup Synchronisation

Figure 3:
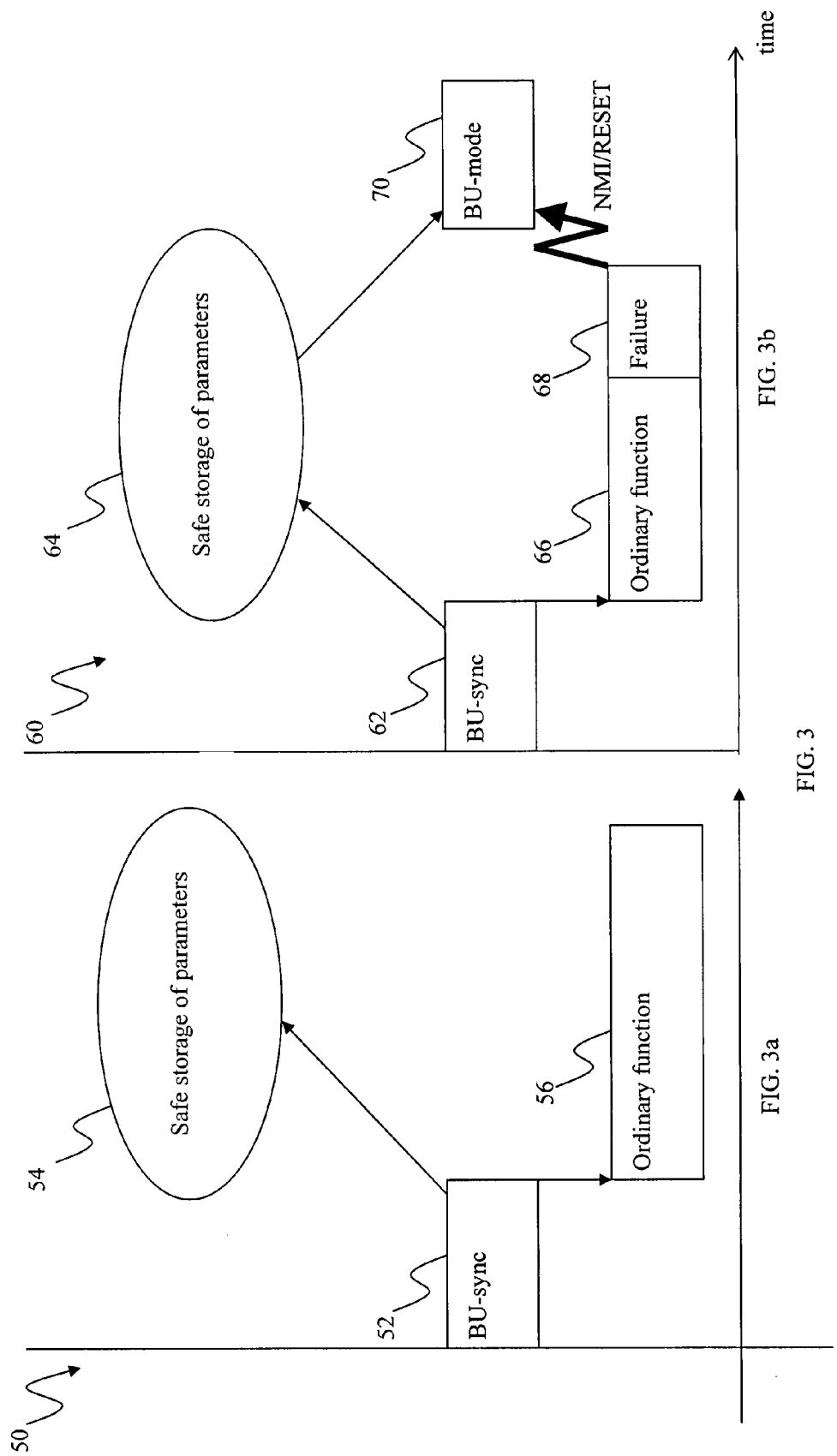
FIG. 3 schematically illustrates the activation of a backup function of the present invention.

Referring to FIG. 3, a timeline is shown along which a process called backup synchronisation is performed. Said backup synchronisation is preferred in order to have process parameters (e.g. flight data parameters) updated and available for the backup-mode software program, when a switch is made from executing a normal mode software program (an ordinary function). A control system is storing a number of parameters and updating the values of the parameters during the backup synchronisation process. In order to store the different parameters of the system, which is disclosed and general indicated as 50 in FIG. 3a, the backup synchronisation process 52 is executed wherein the different parameters are determined, collected and stored in a safe storage of parameters, denoted as 54. It should be understood that even if the backup synchronization process is illustrated as running before the ordinary function is executed, this backup synchronisation may be running in the background, simultaneously along with the ordinary function. In an embodiment of the invention, the parameters are stored in several places in a memory and may or may not be protected by a checksum. After, or during as stated above, the control system has synchronised the parameters and stored the parameters, the control system executes an ordinary function running in a normal mode, as shown in 56. However, in an event of failure, i.e. a systematically occurring fault, the system is forced into a backup mode 60 as illustrated in FIG. 3b. As stated before, the control system first synchronises all the parameters 62 and stores the same parameters in a safe storage 64. The system then runs in a normal mode 66 and when a failure occurs in the system, such as a systematic program error as in the block denoted 68 the system initiates an NMI or Reset. This implies that the normal running program is stopped and the system then switches to a backup mode software program 70 that retrieves the previously stored parameters of the system from the safe storage of the system 64, and the backup mode software program is executed using the retrieved parameters, provided that any checksum used does not indicate corruption of the parameter, wherein the backup mode software program uses a default set of parameters. This backup mode software program then runs until the backup mode is reset, turned off or the likes.

Figure 4:
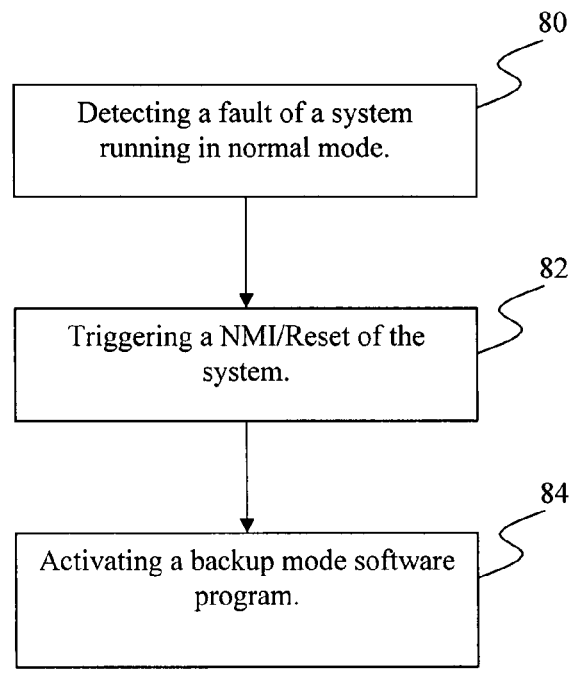
FIG. 4 is a block diagram illustrating the activation of the backup function using the present invention.

Referring to FIG. 4, a method of activating the backup mode software program is described in order to clarify the present invention. In step 80 a fault is detected. This detection may be performed by different systems, different parts of a control system, pilot manoeuvres or the likes. As an example, in order for a voter of a system to activate the backup mode, i.e. the separate software program, the voter must receive two signals from a cockpit of an aircraft that a fault has occurred of a control system of the aircraft. In the cockpit, a pilot, in the example, has three buttons, wherein the pilot must press down at least two of these three buttons in order to activate the backup system on the processor, this avoids the backup mode to be accidental triggered. Herein, the voter may be placed in the cockpit wherein the processor with the backup software program may reside at a different place. In another example two activation units are used wherein a first unit is a sensor that is arranged on the canard of the wing for detecting a fault and a second unit is a fault detector of the control system of the canard for detecting a fault as well. A voter receives fault indications from the sensor as well as from the fault detector and the voter determines that a systematic fault has occurred and sends a triggering command to the processor controlling the canard.

When a fault is detected the system is interrupted by implementing a reset function, NMI or the like, see step 82. Thereby, if the system is running in an erroneous loop or the like this mal-operation is interrupted. In the stated example of the canard the voter sends the triggering command to the processor of the control system of the canard and the processor executes a reset of the normal mode running software program. The control system of the canard is then forced in to a backup mode. This is disclosed in FIG. 4 as step 84. The backup mode mentioned is a software program running separated from the normal software program on the processor, in order to avoid being affected by a systematic fault. By arranging the backup system for faults generated by a systematic error as a software part in the control system, the weight and cost of the control system may be reduced. The backup software program differs from the normal mode software program in order to stay unaffected of the same systematic error.

Figure 5:
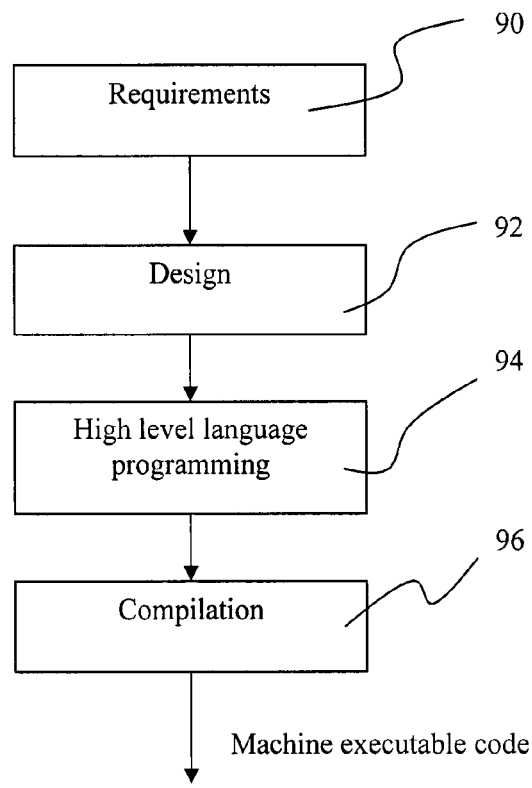
FIG. 5 is a block diagram schematically illustrating the process of developing a software program.

Referring to FIG. 5, a schematic block diagram of a software developing process is shown. To create a software program, the developing process of such program comprises a first step wherein requirements are set up for the software program, a requirement setup step 90, generating, e.g. certain algorithms and the likes. Then the process continues to a design step 92, wherein the program is designed and following that step the program is created, i.e. programmed using a high level language, within a programming step 94, and to enable the program to execute the language is compiled/interpreted using a compiler, within a compilation step 96. The backup software program may differ from the normal software program by being written in a different programming language, using different algorithms, using different compilers, using facilitated control laws or the likes in order to avoid making the same systematic fault in the program, i.e. may differ in the process steps disclosed in FIG. 5. The backup mode software program may comprise the most basal functions in order to take the plane to a landing site or may comprise all/almost all the features of the normal program software.

To reach the main objective of the invention the system is adapted to abort an erroneous normal mode software program, and instead, perform a different backup mode software program that probably does not contain the same systematically generated fault. If such a backup mode software program is designed and implemented properly, this backup mode can handle all systematically generated faults caused by faults in the programming of software, e.g. control laws, and/or hardware implementation, such as erroneous design, source code, logic or executable code.

Activation Unit

The decision to activate and execute a backup mode software program must, due to safety reasons, be taken by a unit that can not be influenced by the same systematic problem that can cause a fault in a normal mode. This implies that the detection software in some cases can be implemented in the normal system but that it is probably easier, from a verifying point of view, to implement the detection software in a different system. An exemplary of the detection unit being implemented in a different system is to implement it in a pilot activated function that activates the backup function or that several systems examine/supervise and determine if the backup function should be activated or a combination of both. The systems may determine to activate the backup mode software program by implementing a choice of majority, i.e. to activate when a majority of systems determines that a fault has occurred. However, it should be understood that some faults should immediately render in an activation of the backup mode software program.

Secure activation can be implemented in a software system through the activation of reset and then set the software in a backup mode or through a NMI which, per definition, can not be ignored by a processor. Both solutions imply that even if the software has ended up in an endless loop, the backup function will be activated and implemented in a secure and safe manner.

In an embodiment of the system, it will be necessary to keep the backup function updated with system parameters, such as altitude, speed, position, servo mode or the like, in order to operate properly. In a software system these parameters can be updated through a cycle of execution and be stored in a safe manner so that normal functions when the system is running in a normal mode and experiences a fault that is not able to cause damage to the backup functions.

Safe storage may be implemented using hardware, or to store data in different part of the memory. In a further embodiment of the invention the backup function determines that the data is reliable by using check sums or other types of error detecting or error correcting codes.

The invention claimed is:

1. A fault tolerant data processing system for controlling a real time process, said system being tolerant to systematic faults in its software, said system comprising:
   a data processor unit with a program memory and a data memory and input and output units where program software residing in the program memory can be executed on the data processor unit
   a normal-mode software program residing in said program memory,
   a backup-mode software program also residing in said program memory arranged to perform the same or similar function of the normal mode software program but being differently implemented than the normal-mode software program, wherein a trigger signal received by the data processor unit can switch execution control such that the normal-mode software program stops executing and the backup-mode software program starts executing,
   a backup activation system comprising a plurality of activation units, wherein the activation units are implemented in the normal-mode software program, wherein the activation units are operative to issue an error signal upon discovery of an error, and a voter unit connected to the data processor unit, wherein each activation unit is connected to the voter unit, wherein the voter unit is configured to issue the trigger signal to interrupt the real time process when a majority of the activation units issue the error signal.

2. The system according to claim 1, wherein the backup-mode software program is differently implemented than the normal mode software program by using different algorithms or different control laws.

3. The system according to claim 1, wherein the backup-mode software program is differently implemented than the normal mode software program by using a different software design, programming language, different compilers, or different linkage editors.

4. The system according to claim 1, wherein said switch of execution control is implemented by letting the trigger signal trigger a Non-Maskable Interrupt which subsequently transfers execution control to the backup-mode software program.

5. The system according to claim 1, wherein said switch of execution control is implemented by activating a Reset subroutine and subsequently forcing execution control to the backup-mode software program.

6. The system according to claim 1, wherein said backup-mode software comprises software instructions for reading and updating process data from the input unit before performing process control via the output unit.

7. The system according to claim 1, wherein process data is stored in more than one place in the data memory and is protected against undetected corruption by a checksum or an error correcting code.

8. The system according to claim 1, wherein the system is a control system of a vehicle.

9. A method for activating a backup mode software program in a real time process of a system that is tolerant to systematic faults in the software of the system, the method comprising:
    connecting a voter unit to a data processor,
    running detection software with a backup activation system comprising a plurality of activation units, wherein the activation units are implemented in a normal-mode software program, wherein each activation unit is connected to the voter unit,
    detecting a fault in said system running the normal-mode software program,
    issuing an error signal with the activation units upon discovery of an error,
    determining with the voter unit if a triggering signal should be sent to interrupt the process,
    issuing the trigger signal with the voter unit to interrupt the real time process with the activation units when a majority of the activation units issue the error signal,
    triggering an interruption to the running normal-mode software, and
    switching execution such that the normal-mode software program stops executing and a backup-mode software program starts executing, wherein the backup-mode software program performs the same or similar function of the normal mode software program but being differently implemented than the normal-mode software program.

10. The method for activating a backup function according to claim 9, further comprising:
    synchronizing the backup mode software program by retrieving parameters and storing the parameters in a safe storage of the control system.

11. The method for activating a backup function according to claim 10, further comprising after the system has been interrupted:
    retrieving the parameters from the safe storage; and
    checking by checksums that the parameters are reliable.

12. The method for activation a backup function according to claim 9, wherein the system is a control system of a vehicle.

13. A fault tolerant real time data processing system, comprising:
    a number of dissimilar hardware replicas of data processing units executing the same software, said software being divided into normal mode software program and backup mode software arranged to perform the same or similar function of the normal mode software program but being differently implemented than the normal-mode software program and where switching from executing normal mode software program to executing backup mode software is initiated by a backup activation system comprising a plurality of activation units, wherein the activation units are implemented in the normal-mode software program, wherein the activation units are operative to issue an error signal upon discovery of an error, and a voter unit connected to the data processor units to determine an output from said data processing units, wherein each activation unit is connected to the voter unit, wherein the voter unit is configured to issue a trigger signal to interrupt the real time process when a majority of the activation units issue the error signal.

14. The system according to claim 13, wherein the output voter is arranged to use a choice of majority in order to determine the output from said data processing units.

15. The system according to claim 13, wherein said system is a control system of a vehicle.

16. A computer program product, comprising:
    a non-transitory computer readable medium; and
    computer program instructions recorded on the computer readable medium and executable by a data processor unit for a real time data processing system, said computer program instructions, when executed in said data processor unit, being able to carry out a method comprising
    connecting a voter unit to a data processor,
    running detection software with a backup activation system comprising a plurality of activation units, wherein the activation units are implemented in a normal-mode software, wherein each activation unit is connected to the voter unit,
    detecting a fault in said system running a normal-mode software program,
    issuing an error signal with the activation units upon discovery of an error,
    determining with the voter unit if a triggering signal should be sent to interrupt the process,
    issuing the triggering signal with the voter unit to interrupt the real time process with the activation units when a majority of the activation units issue the error signal,
    triggering an interruption to the running normal-mode software, and
    switching execution such that the normal-mode software program stops executing and a backup-mode software program starts executing, wherein the backup-mode software program performs the same or similar function of the normal mode software program but being differently implemented than the normal-mode software program.

* * * * *

UNITED STATES PATENT AND TRADEMARK OFFICE
CERTIFICATE OF CORRECTION

| | | |
|---|---|---|
| PATENT NO. | : 7,840,832 B2 | Page 1 of 1 |
| APPLICATION NO. | : 11/798719 | |
| DATED | : November 23, 2010 | |
| INVENTOR(S) | : Rikard Johansson et al. | |

It is certified that error appears in the above-identified patent and that said Letters Patent is hereby corrected as shown below:

Title page, item (75) Inventors: "Kjell Wistedt" should read

"Kjell Wisted"

Signed and Sealed this
Twelfth Day of April, 2011

David J. Kappos
*Director of the United States Patent and Trademark Office*